US009686497B1

(12) United States Patent
Terry

(10) Patent No.: US 9,686,497 B1
(45) Date of Patent: Jun. 20, 2017

(54) VIDEO ANNOTATION AND DYNAMIC VIDEO CALL DISPLAY FOR MULTI-CAMERA DEVICES

(71) Applicant: Crater Group Co., San Francisco, CA (US)

(72) Inventor: Maxwell Hunter Terry, Westbrook, ME (US)

(73) Assignee: Crater Group Co., Sn Francisco, CA (US)

( * ) Notice: Subject to any disclaimer, the term of this patent is extended or adjusted under 35 U.S.C. 154(b) by 0 days.

(21) Appl. No.: 15/339,586

(22) Filed: Oct. 31, 2016

Related U.S. Application Data

(60) Provisional application No. 62/248,295, filed on Oct. 29, 2015.

(51) Int. Cl.
*H04N 7/14* (2006.01)
*H04N 5/445* (2011.01)
*H04L 29/06* (2006.01)
*H04N 7/15* (2006.01)

(52) U.S. Cl.
CPC ..... *H04N 5/44504* (2013.01); *H04L 65/1089* (2013.01); *H04N 7/147* (2013.01); *H04N 7/15* (2013.01); *H04N 5/44591* (2013.01)

(58) Field of Classification Search
CPC ......... H04L 7/147; H04L 7/152; H04L 12/66; H04L 65/1006; H04L 65/1069; H04N 7/15; H04N 21/43615; H04N 21/4788; H04N 21/235; H04N 21/4126; H04N 21/4312; H04N 21/4331; H04N 21/435; G06F 3/04842; G06F 3/04847; G06Q 10/101

USPC .......... 348/14.01, 14.03, 14.07, 14.1, 14.14
See application file for complete search history.

(56) References Cited

U.S. PATENT DOCUMENTS

| | | | |
|---|---|---|---|
| 7,834,923 B2* | 11/2010 | Stavely | G11B 27/032 348/218.1 |
| 2008/0129816 A1* | 6/2008 | Mattila | H04L 12/66 348/14.08 |
| 2009/0069038 A1* | 3/2009 | Olague | H04N 21/235 455/466 |
| 2011/0242317 A1* | 10/2011 | Wengrovitz | H04N 7/181 348/143 |
| 2011/0273526 A1* | 11/2011 | Mehin | H04L 12/66 348/14.01 |
| 2015/0358584 A1* | 12/2015 | Mattson | H04N 7/15 348/14.08 |
| 2016/0142668 A1* | 5/2016 | Curio | H04N 5/772 386/224 |

* cited by examiner

*Primary Examiner* — Binh Tieu
(74) *Attorney, Agent, or Firm* — Knobbe, Martens, Olson & Bear, LLP

(57) ABSTRACT

Systems and methods for the management of video calls are provided. A computing device dynamically determines which video stream, of multiple available video streams, is to be presented full-screen or otherwise most prominently during a video call when a user switches between cameras. The available video streams can include a video stream from a user-facing camera of the device, a video stream from a rear-facing camera of the device, or a video stream from another device. Video of the video call can also be annotated to identify individual items shown in the video, characteristics of the items, and the like. The annotations can be used to generate a summary report of the items in the video.

20 Claims, 7 Drawing Sheets

VIDEO ANNOTATION AND DYNAMIC VIDEO CALL DISPLAY FOR MULTI-CAMERA DEVICES

CROSS-REFERENCE TO RELATED APPLICATION

This application claims priority to U.S. Provisional Patent Application No. 62/248,295, filed on Oct. 29, 2015 and entitled "Method and System for Conducting Surveys via Videocall," the contents of which are incorporated by reference herein for all that they disclose.

BACKGROUND

Computing devices and communication networks can be utilized to exchange content and other information. For example, a first computing device with an integrated or peripheral camera can communicate with a second computing device that also has an integrated or peripheral camera. The first computing device can generate a video stream using its camera and transmit the video stream to the second computing device, which can present the video stream on a display screen. The second computing device can also generate a video stream using its camera and transmit the video stream to the first computing device, which can present the video stream on a display screen. This exchange of video streams between devices may be referred to as a "video call." In a common application, users of the different computing devices position the video cameras to capture video of their own faces. The exchange of video streams thus allows the users to see each other's face while they have a conversation.

Some video call systems, when executing an application on a local device (e.g., the first computing device) present the video stream from a remote device (e.g., the second computing device) in a large or substantially full-screen window. The application also presents the video stream from camera of the local device in a smaller or "picture-in-picture" window. The video stream from the camera of the local device is typically mirrored (e.g., inverted across a vertical axis) such that the user of the local device sees his own face as if he were looking in a mirror. The video stream from the remote device is typically presented without mirroring such that the user of the local device sees the local user's face as if he were sitting across from the other user.

From the perspective of a user of video call system, the system's performance may be defined in terms of the overall system latency, video quality, and ability exchange video of what the user would like to see and/or share with another user.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
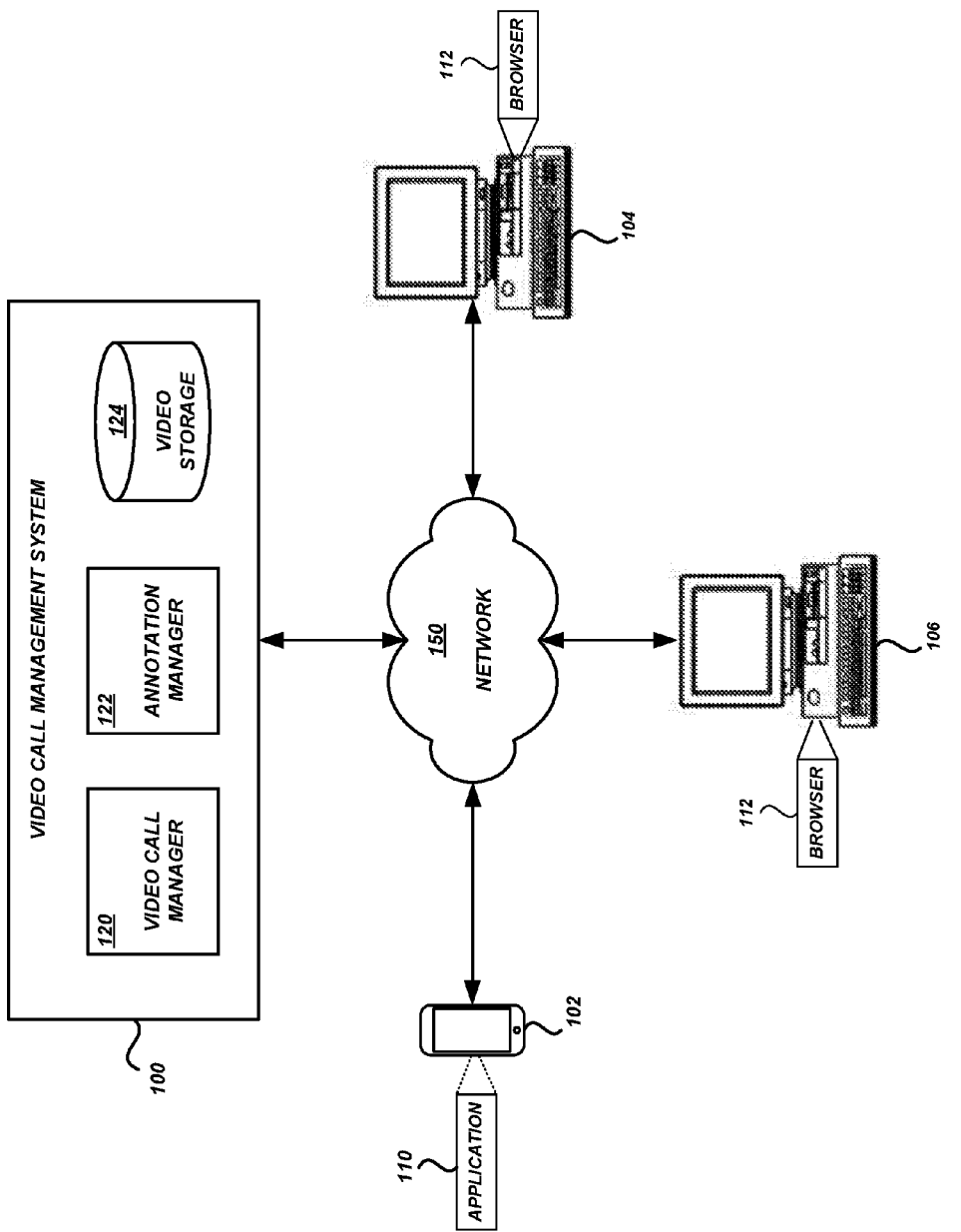
FIG. 1 is a block diagram of an illustrative computing environment including various computing devices and a video call management system according to some embodiments.

The present disclosure is directed to the management of video calls that include video of objects and/or surroundings, rather than including only video of the parties participating in the video calls. When a video call participant is using a multi-camera device and switches between the cameras during the video call, the switch is typically made to provide video of different videographic subjects. For example, a customer may engage in a video call with a surveyor for the purpose of showing the surveyor the customer's belongings, such as for estimating moving costs, appraisal, etc. Such a video call is performed so that the surveyor can remotely view the objects or surroundings in an interactive way, rather than merely viewing pictures previously taken by the customer or a video previously recorded by the customer. The real-time interaction provided by a video call allows the surveyor to direct the customer to move the video camera in certain ways, at certain speeds, to adjust lighting or other environmental variables, etc. The customer may switch from a user-facing camera of the customer's mobile device to a rear-facing camera of the customer's mobile device in order to more easily move around and provide video of objects to the surveyor.

Conventional video call systems and applications typically display a full screen view of the video stream from the surveyor's device (e.g., video of the surveyor's face) on the customer's device, while presenting a smaller picture-in-picture view of the video stream from the customer's own device. This configuration is generally acceptable or even preferable when engaging in a face-to-face conversation, or when it is otherwise more desirable to see the video generated by the other party to the video call than it is to see the video generated from the local device. However, when attempting to provide video of objects or environmental surroundings, the smaller display of the video stream from the customer's own device can be less than optimal. In this case, it is the video generated by the customer's device (e.g., of the customer's own surroundings) that is most important or otherwise most desirable for both parties to see clearly, not only the surveyor.

Some aspects of the present disclosure relate to dynamically determining which video stream is to be presented full-screen or otherwise most prominently on a video call participant's device when the participant switches between cameras. In this way, the most effective display can be automatically provided to the participant regardless of the situation. For example, a video call participant's device can provide the participant with an option to select from a user-facing camera and a rear-facing camera. When the user-facing camera is activated, video from another participant's device can be presented in a primary display region (e.g., substantially full screen), while video from the user-facing camera can be presented in a secondary display region (e.g., a smaller picture-in-picture box). When the rear-facing camera is activated, the video from the other participant's device can be moved to the secondary display region, and video from the rear-facing camera can be presented in the primary display region. The participant may then be able to more clearly see the video that is being provided to the other participant's device. This display configuration can aid the participant in adjusting the camera and properly framing the view of desired objects or surroundings, particularly in cases where providing the video is the principal purpose of the call (e.g., surveying, appraisal, etc.).

Additional aspects of the present disclosure relate to annotating portions of video calls. Some video calls are performed so that parties can remotely view particular objects and surroundings, such as video call to conduct surveys, appraisals, etc. The particular objects shown in the videos are of primary interest, and it may be desirable to annotate the video with information regarding the displayed objects. To simplify the annotation process and ensure that the annotations are stored in connection with the proper objects in the video, annotations can be applied to the video, either during the video call or to a recording of the video call. In some embodiments, a viewer of the video call (either live or at a later time) can be presented with an interface that allows the application of annotations to the video. For example, a viewer can flag portions of a video call as including video of a particular location, such as specific room of a house. As another example, a viewer can flag portions of a video as including video of a particular object, such as a specific household item to be appraised or included in a moving estimate. As a further example, a viewer can tag individual objects with particular characteristics, such as fragile, flammable, containing liquid, etc. Information about the annotations can be embedded into the video or stored in association with the video. In some embodiments, the annotation information can be used to automatically analyze the video, such as to generate a report of all items to be moved, the size of the items, and an estimated cost of the move based on items and their respective sizes.

Although aspects of some embodiments described in the disclosure will focus, for the purpose of illustration, on particular examples of devices, video calls, and annotations, the examples are illustrative only and are not intended to be limiting. In some embodiments, the techniques described herein may be applied to additional or alternative devices, video calls, and annotations. For example, the systems and methods described herein may be applied to video calls for inspections, estimates, diagnoses, claims, and other situations in which one party is providing video of surroundings, objects, and the like instead of, or in addition to, engaging in a video-based face-to-face conversation. Various aspects of the disclosure will now be described with regard to certain examples and embodiments, which are intended to illustrate but not limit the disclosure.

Video Call Management Environment

With reference to an illustrative embodiment, FIG. 1 shows a network environment in which aspects of the present disclosure may be implemented. As shown, the network environment may include a video call management system 100 and various user devices 102, 104, and 108. The user devices 102, 104, 106 and video call management system 100 may communicate with each other via one or more communication networks 150. A communication network 150 may be a publicly accessible network of linked networks, possibly operated by various distinct parties, such as the Internet. In other embodiments, a network 150 may include a private network, personal area network, local area network, wide area network, cable network, satellite network, cellular telephone network, etc. or a combination thereof, some or all of which may or may not have access to and/or from the Internet. Although one communication network 150 is shown, in some embodiments the user devices 102, 104, and 106 (or some subset thereof) may each communicate with each other and/or with the video call management system 100 via multiple, separate communication networks.

The video call management system 100 may include various components for providing the features described herein. Illustratively, the video call management system 100 may include a video call manager 120 to manage the establishment of a video call and/or to record the video call. The video call management system 100 may also include an annotation manager 122 that receives annotations of in-process or recorded video calls, and manages the storage of the annotations in association with video of the video calls. The video call management system 100 may also include video storage 124 to store video of the video calls managed by the video call management system 100, annotations of the video calls, etc. The example components and data stores of the video call management system 100 shown in FIG. 1 are illustrative only, and are not intended to be limiting. In some embodiments, a video call management system 100 may have fewer, additional, and/or alternative components and data stores.

The video call management system 100 may be implemented on one or more physical server computing devices that provide computing services and resources to user devices 102, 104, 106, etc. In some embodiments, the video call management system 100 (or individual components thereof, such as the video call manager 120, annotation manager 122, etc.) may be implemented on one or more host devices, such as blade servers, midrange computing devices, mainframe computers, desktop computers, or any other computing device configured to provide computing services and resources. For example, a single host device may execute one or more video call managers 120, one or more annotation managers 122, one or more video storages 124, some combination thereof, etc. The video call management system 100 may include any number of such hosts.

In some embodiments, the features and services provided by the video call management system 100 may be implemented as web services consumable via a communication network 150. In further embodiments, the video call management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual user devices 102, 104, 106 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A video call participant may operate a user device 102 to access and interact with other user devices 104, 106 and/or the video call management system 100. In some embodiments, a video call participant may launch specialized application software, such as a mobile application 110, to execute on a particular user device 102, such as a smart phone or tablet computer. The application 110 may be specifically designed to interface with the video call management system 100 and/or other user devices for conducting video calls or "chats." In some embodiments, a user may use other application software, such as a browser application 112, to interact with the video call management system 100 and/or other user devices.

Figure 2:
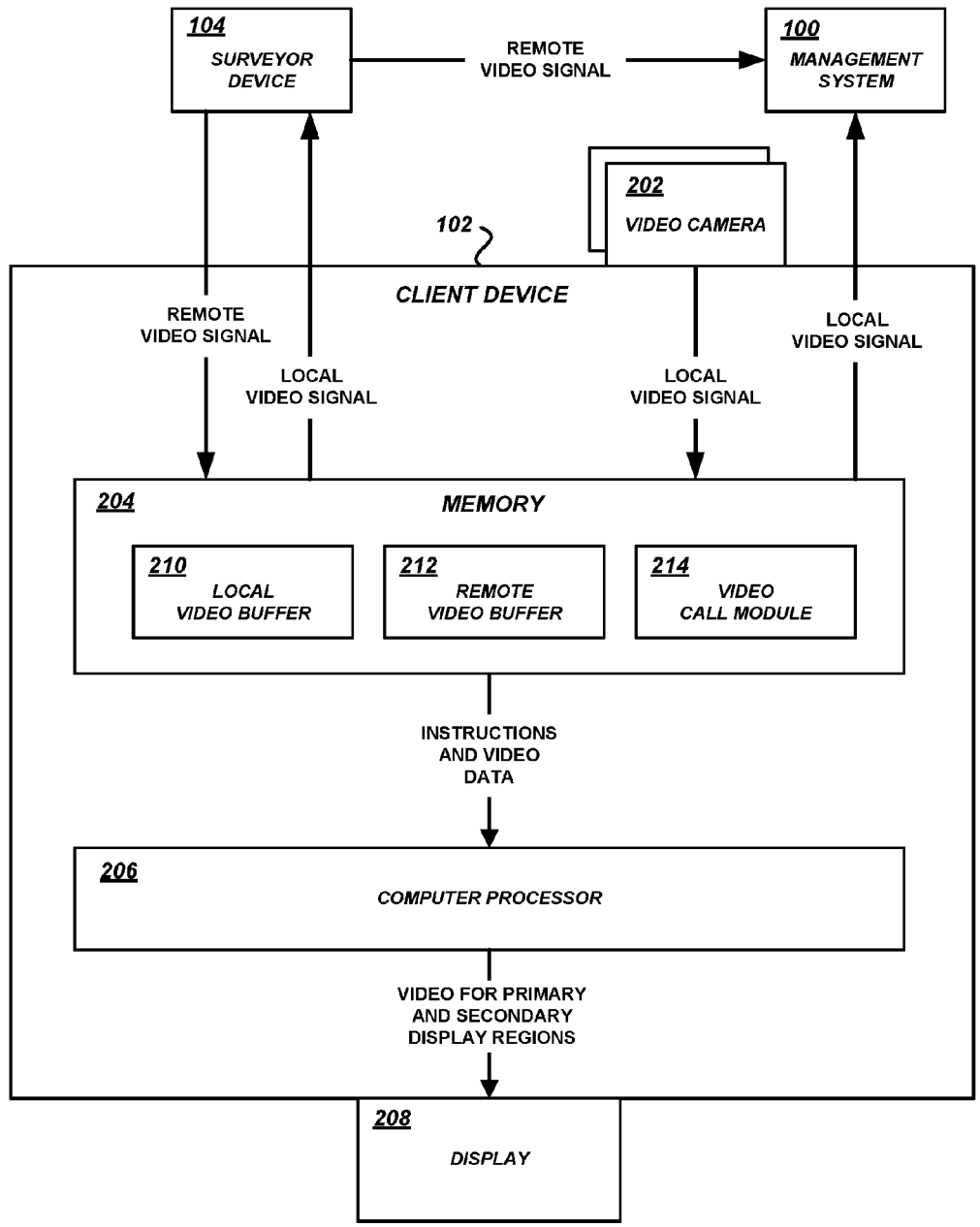
FIG. 2 is a block diagram of data flows and interactions among various components of a computing device during a video call according to some embodiments.

FIG. 2 is a block diagram showing data flows and interactions between various components of a user device 102, as well as data flows and interactions between the user device 102, another user device 104, and the video call management system 100. In one illustrative non-limiting example, user device 102 may be referred to as a "client device" (e.g., when operated by a customer), and user device 104 may be referred to as a "surveyor device" (e.g., when operated by a surveyor). The video call management system 100 may be referred to as the "management system" for brevity.

As shown, the client device 102 may include multiple video cameras 202, one or more memories 204, one or more computer processors 206, and one or more displays 208. A local video signal generated by one of the video cameras 202 can be buffered in a local video buffer 210, which may be in a main memory 204 of the client device 102 (e.g., random access memory or "RAM"), or which may be in an auxiliary memory. A remote video signal, such as a video signal received from or originating from the surveyor device 104, can be buffered in a remote video buffer 212, which may be in the main memory 204 or in an auxiliary memory. The local video signal (or data derived therefrom, such as a compressed version) can also be provided to the surveyor device 104 and/or the management system 100.

An application such as a video call module 214 may be loaded into main memory 204 from a persistent storage of the client device 102. In some embodiments, the video call module 214 may be a temporary application (e.g., downloaded and executed within another process, such as a browser application). The computer processor 206 can execute instructions of the video call module 214 to manage the video call on the client device 102, including the dynamic change of display based on which video camera 202 is active as described in greater detail below.

Example Video Call Process

Figure 3:
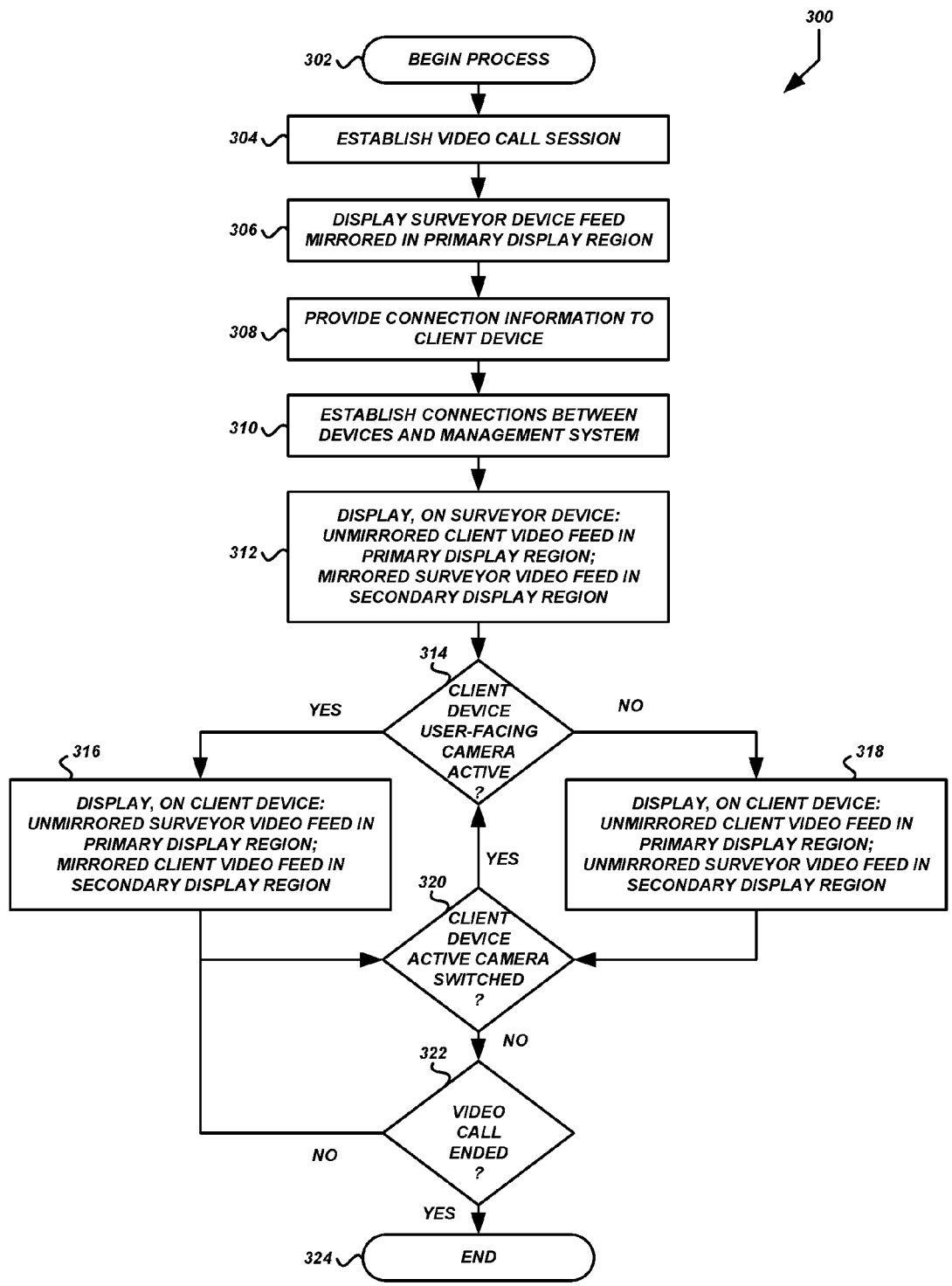
FIG. 3 is a flow diagram of an illustrative process for managing a video call according to some embodiments.

FIG. 3 is a flow diagram of an illustrative process 300 that may be executed by user devices, such as the client device 102 and surveyor device 104 shown in FIG. 2, to manage how video streams are to be presented on displays of the respective devices at various stages during a video call. Advantageously, a client device 102 can execute portions of the process 300 to dynamically determine which video stream is to be presented full-screen or otherwise most prominently on a display 208 of the client device 102 when a video call participant switches between video cameras 202. The process 300 will be described with respect to the illustrative surveyor device 104 displays shown in FIGS. 4A and 4B, and the illustrative client device 102 displays shown in FIGS. 5A and 5B.

The process 300 shown in FIG. 3 begins at block 302. The process 300 may begin in response to an event, such as when input is received by a surveyor device 104 to establish a video call with a client device 102. When the process 300 is initiated, a set of executable program instructions stored on one or more non-transitory computer-readable media (e.g., hard drive, flash memory, removable media, etc.) may be loaded into memory (e.g., random access memory or "RAM") of a computing device. The executable instructions may then be executed by a hardware-based computer processor (e.g., a central processing unit or "CPU") of the computing device. In some embodiments, the process 300 or portions thereof may be implemented on multiple processors or separate computing devices altogether, serially or in parallel.

At block 304, surveyor device 104 may establish a video call session. For example, a customer may be moving, and may hire a moving company to manage the move. In order to provide an estimate of how much the move will cost, the moving company may wish to survey the customer's home and view the objects to be moved. Rather than conduct an in-person survey, which can be cost-prohibitive, a virtual survey may be commissioned. A surveyor can launch application software on the surveyor device 104, such as a browser application 112 or a specialized application to engage in video calls. The browser application 112 or other application can connect to a video call management system 100, obtain network resources (e.g., web pages, code files), or perform other operations to begin the video call session on the surveyor device 104. In some embodiments, the video call manager 120 of the management system 100 can establish the video call session by initializing storage to record video of the video call or performing other pre-call processing.

Figure 4A:
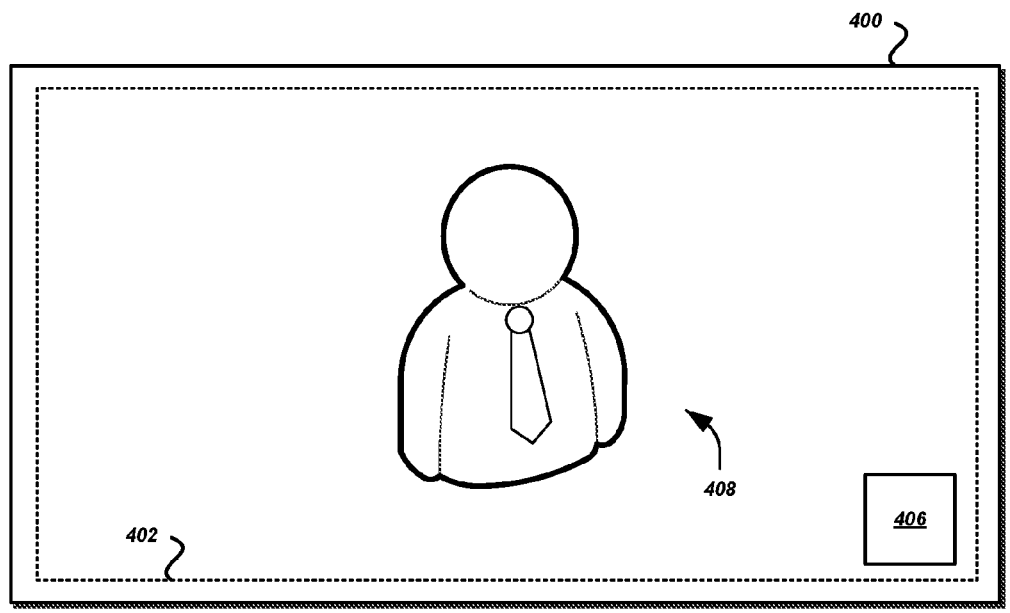
FIGS. 4A and 4B are pictorial diagrams of illustrative surveyor device user interface displays during a video call according to some embodiments.

At block 306, the surveyor device 104 may initially display a video stream from a video camera integrated with or otherwise in communication with the surveyor device 104. For example, as shown in FIG. 4A, a user interface 400 of the surveyor device 104 can include a primary display region 402. The video stream from the video camera can be displayed in the primary display region 402 so that the surveyor can check how he/she will look to the customer, to make adjustments, etc. Illustratively, the primary display region 402 may be a large or substantially full screen region of the display of the corresponding device. Video of the surveyor 408 can be captured by a peripheral video camera or "web cam." In some embodiments, the display of the video stream from the video camera can be mirrored so that the surveyor will see the display as though the surveyor is looking into a mirror. For example, the video images can be reflected across a vertical axis that bisects the left and right sides of the image. In this way, the left side of the surveyor's face (from the surveyor's viewpoint) will appear on the left side of the primary display region 402, when it would typically appear on the right side of the primary display region 402 if no mirroring was applied. The mirroring may be applied to the video stream within memory of the surveyor device, such as when the data from the video stream is placed into a display buffer for display.

In some embodiments, a visual indicator of the source of the video call may be displayed. For example a logo 406 of the moving company or surveyor may be displayed at a static or variable location on primary display region 402. As another example, chroma key compositing (a "green screen") may be used to display a logo or to artificially apply a background to the display.

A block 308, the surveyor device 104 may provide connection information to the client device 102. In some embodiments, the surveyor device 104 may transmit a message to the client device 102, inviting the client device 102 to participate in a video call with the surveyor device 104. For example, the surveyor device 104 may transmit an email or text message with connection information, such as a link to join the video call directly or to download an application 110 that will be used to join the video call. As another example, the surveyor device 104 may transmit a notification that the application 110 on the client device 102 is configured to receive. In some embodiments, the connection information may be provided via the management system 100 rather than directly from the surveyor device 104.

At block 310, the surveyor device 104, client device 102, and/or management system 100 may establish connections with each other to conduct the video call. In some embodiments, the surveyor device 104 and client device 102 may establish a peer-to-peer connection or otherwise communicate directly with each other (e.g., without going through an intermediary server system such as the management system 100). For example, the surveyor device 104 and client device 102 may exchange video streams generated by their respective video cameras such that each device can display video generated by the other device. The surveyor device 104, the client device 102, or both devices may also establish connections with the management system 100. For example, the devices 102, 104 may also provide their respective video streams to the management system 100 so that the management system 100 can store a video record of the video call for future use, such as the annotation process described in greater detail below. In some embodiments, the surveyor device 104 and client device 102 may not exchange video streams directly, but may instead communicate through an intermediary such as the management system 100.

Figure 4B:
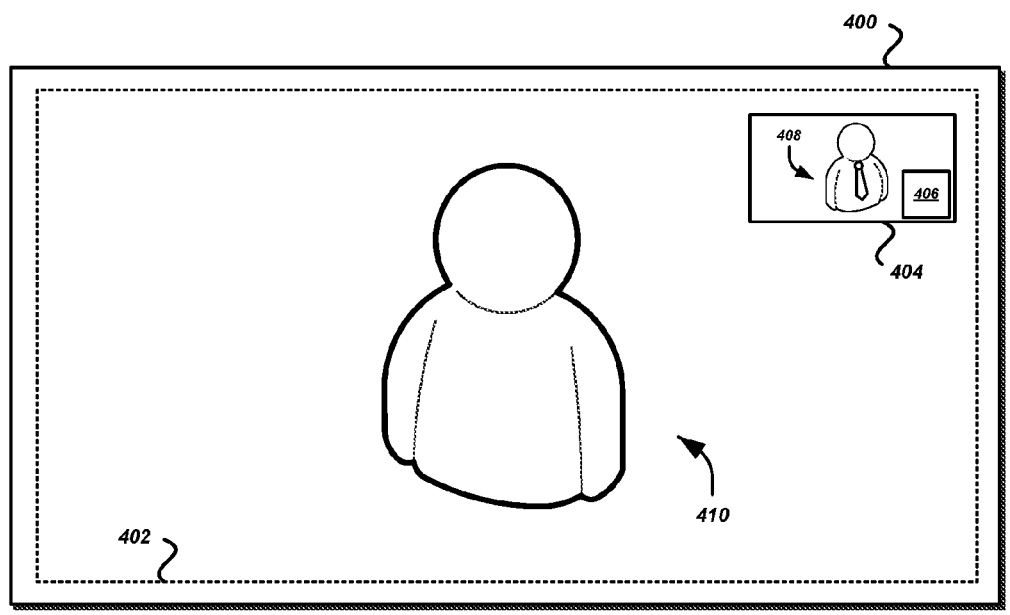

At block 312, the surveyor device 104 may display the video stream from the client device 102. For example, as shown in FIG. 4B, the surveyor device 104 may display the video stream from the client device 102 in the primary display region 402 without mirroring. The video stream from the client device 102 may initially be video of the customer 410. The video stream from the surveyor device 104, previously displayed in the primary display region 402 with mirroring, may be moved to a secondary display region 404 with mirroring. The secondary display region 404 may be substantially smaller than the primary display region 402. Illustratively, the height of secondary display region 404 may be between about 10% to about 25% of the height of the primary display region 402, and the width of the secondary display region 404 may be between about 10% to about 25% of the width of the primary display region 402. In some embodiments, the secondary display region 404 may be presented at least partially overlapping the primary display region 402, such as a picture-in-picture display. In some embodiments, the secondary display region 404 may be presented adjacent or otherwise not overlapping the primary display region 402. In some embodiments, the location of the secondary display region 404 may be predetermined and static, while in other embodiments the location of the secondary display region 404 may be user-selectable or dynamically user-adjustable.

At decision block 314, the application 110 or some other module or component of the client device 102 can determine which video camera 202 is active, of the multiple video cameras 202 integrated with or in communication with the client device 102. For example, the client device 102 may have a user-facing camera and a rear-facing camera. The user-facing camera may be a video camera on the same face of the client device 102 as the display 208, such that a user can direct the user-facing camera at his/her own face and simultaneously see a substantially real-time video stream from the camera on the display 208. The rear-facing camera may be a video camera on some other face or other surface of the client device 102, such as a substantially parallel or substantially orthogonal face with respect to the face on which the display 208 is positioned. Illustratively, the rear-facing camera may be on a substantially parallel face and may point in a direction that is opposite the direction of the user-facing camera and display 208. If the user-facing camera is active, the process 300 can proceed to block 316. Otherwise, if the rear-facing camera is active, the process 300 can proceed to block 318.

Figure 5A:
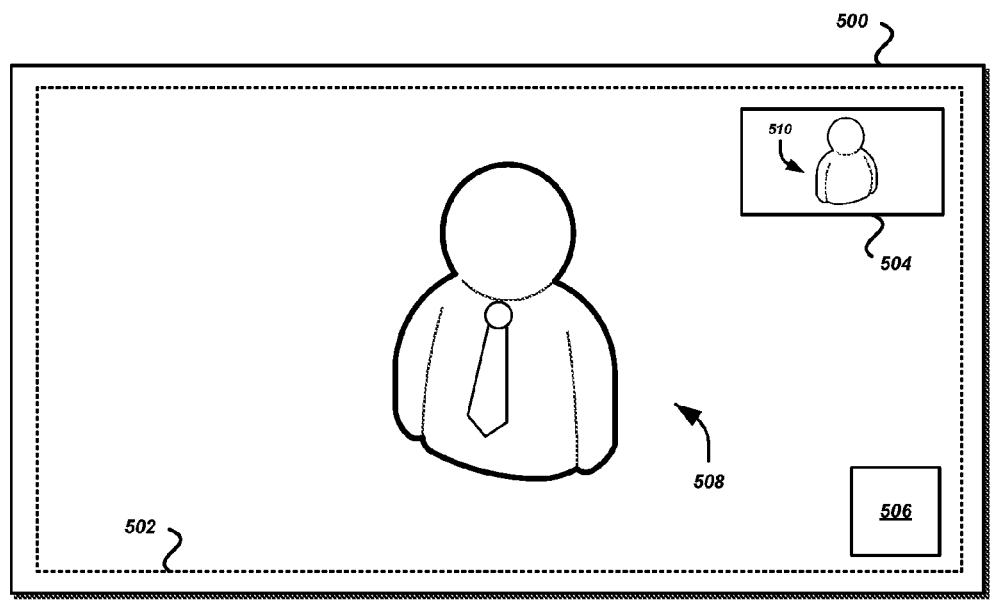
FIGS. 5A and 5B are pictorial diagrams of illustrative client device user interface displays during a video call according to some embodiments.

At block 316, the application 110 or some other module or component of the client device 102 can display the video stream from the surveyor device 104 in a primary display region, and the video stream from the user-facing camera in a secondary display region. For example, as shown in FIG. 5A, the client device 102 may display a user interface 500, which may have a primary display region 502 and a secondary display region 504. The application 110 may display the video stream from the surveyor device 104 in the primary display region 502 without mirroring. As shown in FIG. 5A, the video stream from the surveyor device 104 may include video of the surveyor 508, a logo 506 or other source indicator, etc. The application 110 may display the video stream from the user-facing camera of client device 102 in the secondary display region 504. As shown in FIG. 5A, the video stream from the user-facing camera may include video of the customer 510. In this way, the customer can see what he/she looks like in the video stream provided to the surveyor device 104, and the video stream from the user-facing camera may be mirrored as described in greater detail above so that the display is like that of looking into a mirror. As with the primary and secondary regions of the surveyor device 104, the secondary display region 504 of the client device may be substantially smaller than the primary display region 502. Illustratively, the height of secondary display region 504 may be between about 10% to about 25% of the height of the primary display region 502, and the width of the secondary display region 504 may be between about 10% to about 25% of the width of the primary display region 502. In some embodiments, the secondary display region 504 may be presented at least partially overlapping the primary display region 502, such as a picture-in-picture display. In some embodiments, the secondary display region 504 may be presented adjacent or otherwise not overlapping the primary display region 502. In some embodiments, the location of the secondary display region 504 may be predetermined and static, while in other embodiments the location of the secondary display region 504 may be user-selectable or dynamically user-adjustable.

Figure 5B:
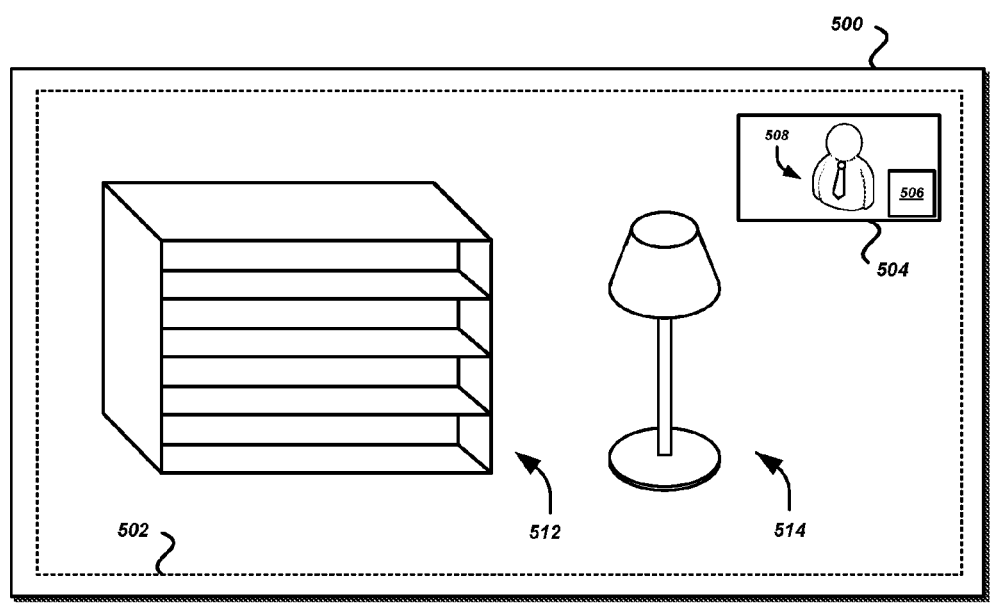

At block 318, the application 110 or some other module or component of the client device 102 can display the video stream from the rear-facing camera of the client device 102 in the primary display region 502, and the video stream from the surveyor device 104 in the secondary display region 504 as shown in FIG. 5B. In this way, the customer can see a larger view of what is being transmitted to the surveyor device 104 that if the video stream from the rear-facing camera were displayed in the secondary display region 504. For example, the surveyor may direct the customer to move to certain locations, frame certain objects 512 and 514 within the field of view, etc. By presenting the video stream from the rear-facing camera in the primary display region 502, the customer can more easily make adjustments requested by the surveyor, adjustments to provide a better view to the surveyor, etc. Illustratively, when the rear-facing camera of the client device 102 is active, the display on both the client device 102 and surveyor device 104 (or at least the displays within the corresponding primary display regions 502, 402 and secondary display regions 504, 404) may be similar or substantially the same. One difference may be the mirroring applied at the surveyor device 104 to the video stream from the surveyor device 104, when there is no such mirroring applied to the video stream from the surveyor device 104 as displayed on the client device.

At decision block 320, the application 110 or some other module or component of the client device 102 can determine whether the active camera has been switched. For example, the active camera may be switched from the user-facing camera to the rear-facing camera during the video call, when transitioning from the introductory portion of the video call to the survey portion. As another example, the active camera may be switched from the rear-facing camera to the user-facing camera during the video call, when transitioning from the survey portion to a conclusion of the video call. User activation of a different camera may cause an event notification to be generated, which can trigger the evaluation of decision block 320. In some embodiments, a data field or other specific portion of memory may store data indicating the currently active camera. The application 110 can monitor the data field for a change, which can trigger the evaluation of decision block 320. If the active camera has switched to a different camera, the process 300 can return to decision block 314.

At decision block 322, the application 110 or some other module or component of the client device 102 can determine whether the video call has ended. If the video call has ended, the process 300 can terminate at block 324. Otherwise, if the video call is ongoing, the process 300 can return decision block 314 where the active video camera is monitored. In some embodiments, one party may end his/her participation in the video call or may be disconnected from the video call, while the other party remains in the video call. For example, if the surveyor leaves or is disconnected from the video call, the process 300 can return to block 314 for the customer, only without the surveyor video stream being present. If the surveyor (or some other party) then re-joins the video call, the process 300 may return to block 310. As another example, if the customer leaves or is disconnected from the video call, the process 300 can return to block 306, where the surveyor can then re-invite the customer (or some other party) at block 308, or the customer can use the connection information already received to re-join at block 310.

Example Video Call Annotation Process

Figure 6:
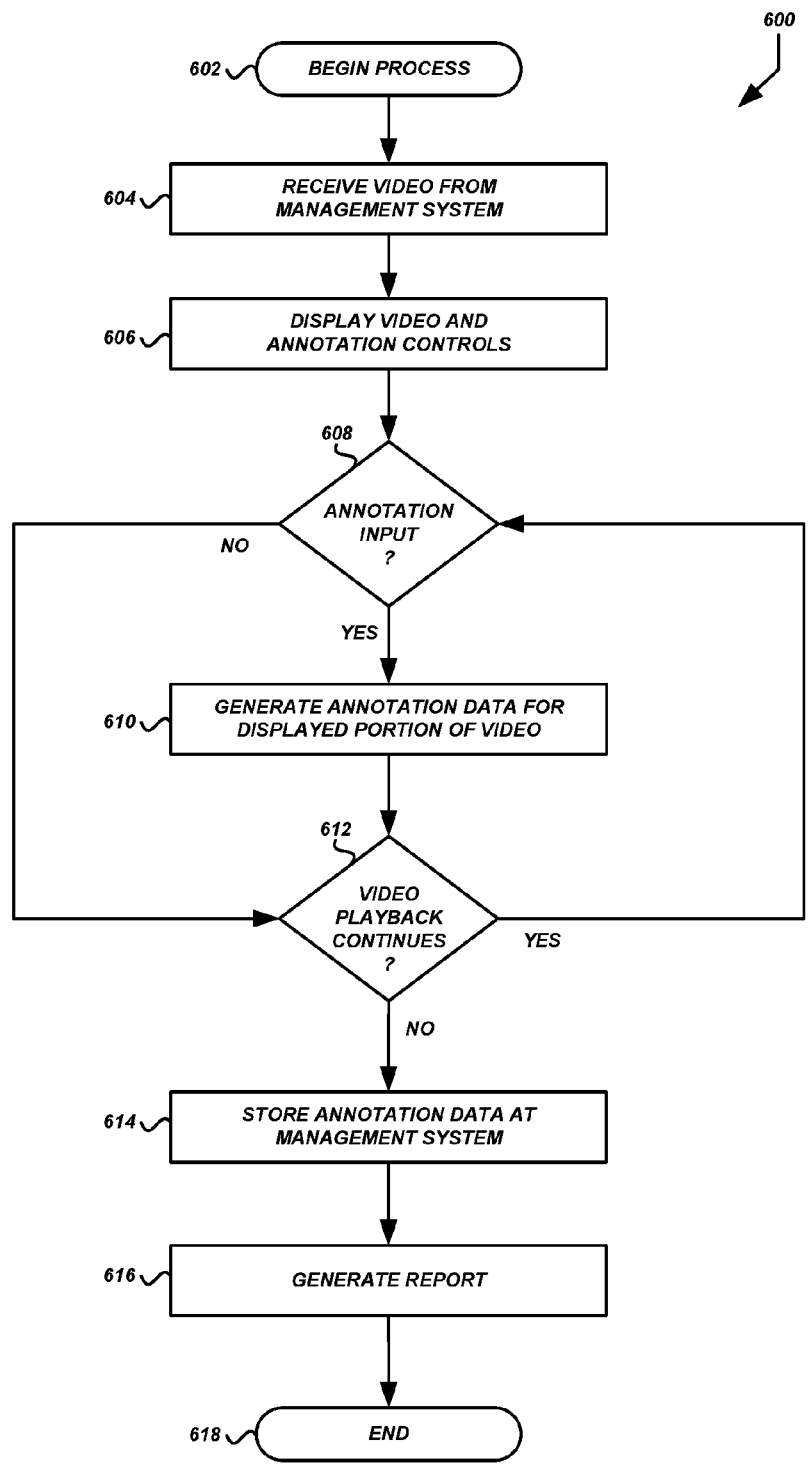
FIG. 6 is a flow diagram of an illustrative process for annotating a video call according to some embodiments.

FIG. 6 is a flow diagram of an illustrative process 600 that may be executed by a user device and a video call management system 100 to annotate video of a video call. The process 600 will be described with respect to the illustrative displays 700 shown in FIGS. 7A and 7B. Advantageously, the process 600 can be performed to generate annotations regarding objects shown in a video call, and to generate a report regarding those objects. In this context, the user device (such as the user device 106 shown in FIG. 1) may be referred to as a viewer device, and may be separate from the client device 102 and surveyor device 104 actively participating in the video call. The viewer device 106 may access video of the video call in substantially real time (e.g., the viewer device 106 may be a third party to the video call) or after the call has ended (e.g., the viewer device 106 may access a recorded video of the video call). In some embodiments, the surveyor device 104 may perform the operations of the viewer device 106 described herein, either during the video call or after the video call has ended.

The process 600 shown in FIG. 6 begins at block 602. The process 600 may begin in response to an event, such as when input is received by a viewer device 106 to view and annotate video calls. When the process 600 is initiated, a set of executable program instructions stored on one or more non-transitory computer-readable media (e.g., hard drive, flash memory, removable media, etc.) may be loaded into memory (e.g., random access memory or "RAM") of a computing device. The executable instructions may then be executed by a hardware-based computer processor (e.g., a central processing unit or "CPU") of the computing device. In some embodiments, the process 600 or portions thereof may be implemented on multiple processors or separate computing devices altogether, serially or in parallel.

At block 604, the viewer device 106 may receive video of a recorded or ongoing video call. The viewer device 106 may receive the video from the management system 100 (e.g., in the case of a previously-recorded video call) or from the devices 102 and/or 104 (e.g., in the case of an ongoing video call).

Figure 7A:
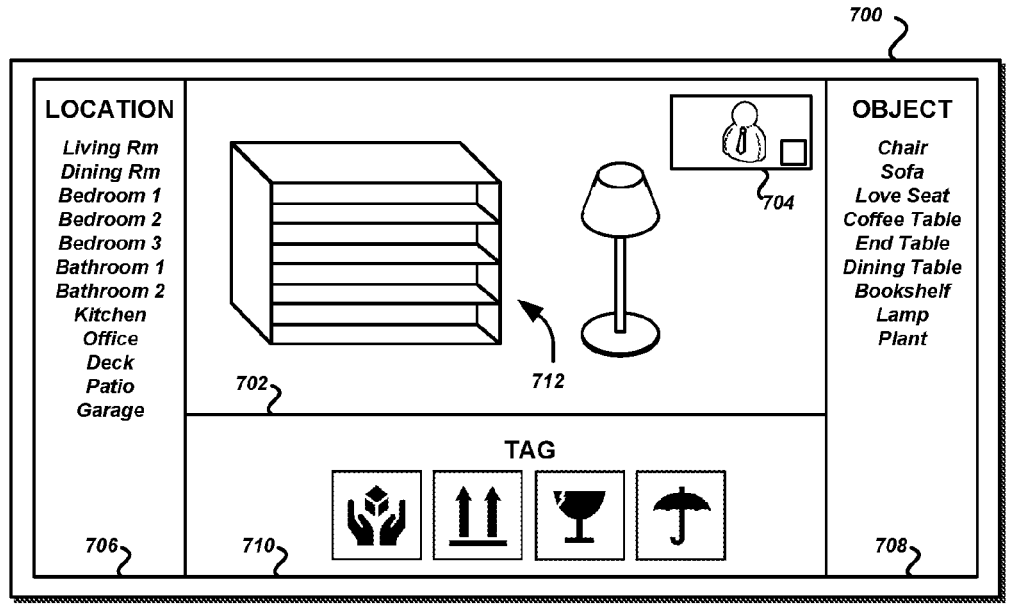
FIGS. 7A and 7B are pictorial diagrams of illustrative viewer device user interface displays during annotation of a video call according to some embodiments.

At block 606, the viewer device 106 may display the video of the video call. For example, as shown in FIG. 7A, the viewer device 106 may present a user interface 700. Within the interface 700, there may be a primary display region 702, a secondary display region 704, and one or more annotation regions 706, 708, and 710. The video displayed in the primary and secondary display regions 702, 704 may be the video as displayed in the primary and secondary display regions on the user device 102 or the surveyor device 104. As described above, the primary display region 402 of the surveyor device interface 400 and the primary display region 502 of the user device interface 500 both display the video stream from the rear-facing camera of the user device 102 when that camera is active. The video stream from the rear-facing camera of the user device 102 may generally be the video stream to which most or substantially all annotations are made, and therefore it may not matter which video recording is displayed on the viewer device interface 700: a recording of the interface 400 displayed on the surveyor device 104 during the video call, or a recording of the interface 500 displayed on the user device 102 during the video call. In some embodiments, a user of the viewer device 106 may select which of the recordings to display. In some embodiments, a source video stream as generated by each video camera that is active during the video call may be stored at the management system 100, and the interface 700 that is presented on the viewer device 106 may be generated from those video streams rather than displaying recordings of the user interfaces 400, 500 of the video call participants' devices. For example, the video stream from the user device 102 rear-facing camera that is presented on the surveyor device 104 during the video call may be compressed (e.g., a lower resolution representation of the full resolution recording) to reduce latency during the live video call. However, a recording of the video stream for the user device's 102 rear-facing camera may be provided to the management system 100 and stored with a lower level of compression or with no compression at all. Therefore, the viewer device 106 can later present the higher quality version of the video stream (in comparison with the version presented on the surveyor device 104). The same storage and viewing process may be used with video streams from other cameras (e.g., the user-facing camera of the user device 102, the camera of the surveyor device 104).

As shown in FIG. 7A, the interface 700 can include additional display regions to facilitate annotation of the video call. For example, a location selection region 706 may be provided to allow a user to identify the location being displayed in a current frame or sequence of the video call. As another example, an object selection region 708 may be provided to allow the user to identify the object(s) being displayed in the current frame or sequence. As a further example, a tag selection region 710 may be provided to allow the user to identify characteristics of the location and/or objects being displayed in the current frame or sequence. The annotation regions shown in FIGS. 7A and 7B and described herein are illustrative only, and are not intended to be limiting. In some embodiments, additional, fewer, and/or alternative annotation regions may be provided. In some embodiments, the annotation regions may be displayed in a partially transparent manner over the primary display region 702, or may be collapsible or otherwise able to be hidden from view. This can allow the primary display region 702 to cover a larger area of the interface 700, allowing more space to add annotations.

At decision block 608, the viewer device 106 or management system 100 can determine whether annotation input has been received. For example, a user of the viewer device 106 may select or otherwise activate portions of the annotation regions 706, 708, and/or 710 to add an annotation to the video. If annotation input has been received, the process 600 can proceed to block 610. Otherwise, if no annotation input is received, the process 600 can proceed to decision block 612.

Figure 7B:
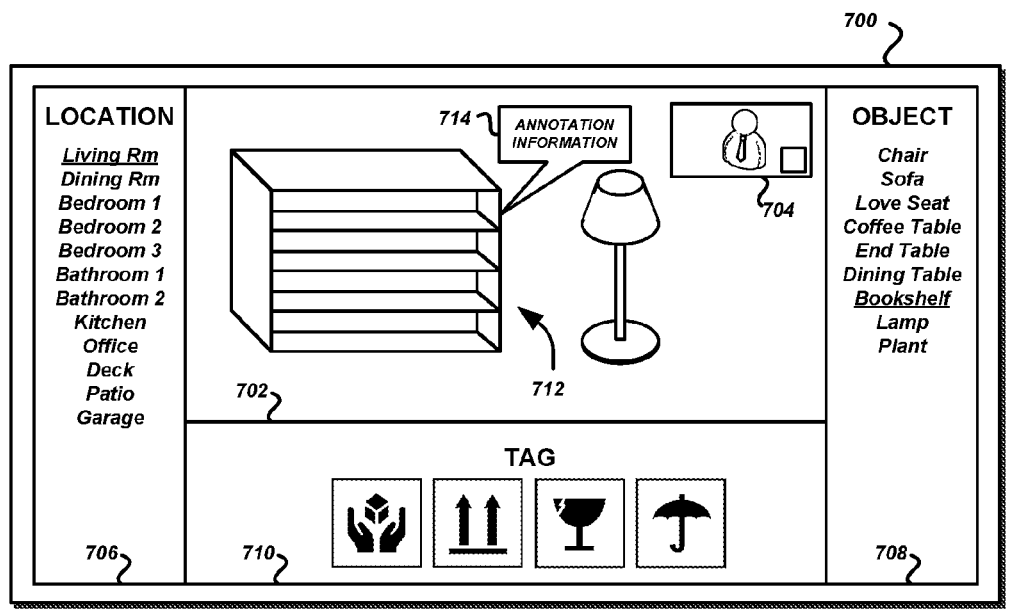

At block 610, the viewer device 106 or management system 100 can generate annotation data for the currently-displayed portion of the video call. For example, a user may select the "living room" option from the location selection region 706, the "bookshelf" option from the object selection region 708, and/or a tag from the tag selection region 710. As shown in FIG. 7B, the selected options may be indicated within their respective selection regions though the use of a visual effect (e.g., bold, underline, highlight, change in font size, color or family, etc.). In some embodiments, the selected options or other information may be specifically associated with an object or sub-region of the displayed video. For example, a bookshelf 712 may be shown. The user of the viewer device 106 may wish to add an annotation regarding the bookshelf so that the bookshelf can be properly considered during some subsequent process, such as the estimate of moving costs. The user can select the options for "living room" and "bookshelf" to indicate that this is a bookshelf in the living room of the customer's house. The user may also select the portion of the display region 702 in which the bookshelf itself is displayed, and add annotation information 714 to the displayed object. The annotation information 714 may include the selected annotation options ("living room" and "bookshelf"), a free-form text entry, an estimated size, or information regarding some other relevant characteristic of the selected object.

At decision block 612, the viewer device 106 or management system 100 can determine whether video playback is continuing. If so, the process 600 may return to decision block 600 to determine whether annotation input has been received. Otherwise, if video playback has ended, the process 600 may proceed to block 614.

At block 614, the annotation data generated above at block 610 can be stored at the management system 100. The annotation data may be embedded into to the video such that any subsequent playback of the video also includes presentation of the annotations added thereto, such as display of the annotation information 714 or an option to view the selected annotation options (e.g., "living room" and "bookshelf"). In some embodiments, the annotation information may be stored separately from the video instead of, or in addition to, being embedded into the video. For example, an annotation may be stored as a database record with an association to the corresponding portion of the video, such as a timestamp, display coordinates, etc.

At block 616, the viewer device 106 or management system 100 can generate a report using the annotation information provided above. In the present example, where the video and annotations relate to a survey for determining a moving cost estimate, the report may be a "cubing" report. The cubing report can summarize the volume, in cubic units (e.g., cubic feet) of items to be moved. In the present example, the cubing report can summarize the volume of items appearing in the video. For example, each item annotated as described above may be added to the cubing report. The dimensions or total volumes of the items may be manually estimated by the viewer and entered as annotation text, automatically estimated using computer vision processing, or estimated using a predetermined list of items and corresponding dimensions or total volumes. The cubing report can be generated based on the dimensions or total volumes The process 600 can terminate at block 618.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a video call management system comprising at least one server machine, wherein the video call management system is configured to at least:
receive a first video stream from a first user device and a second video stream from a second user device, wherein the first video stream and second video stream correspond to a video call involving the first user device and the second user device;
receive, from a viewer device, one or more annotations associated with a portion of the video call; and
store the annotations in association with video representative of the video call; and
an application module that executes on the first user device, wherein the application module configures the first user device to at least:
identify an active camera of a plurality of cameras of the first user device, wherein the first video stream corresponds to a video stream generated using the active camera, and wherein the plurality of cameras comprises a user-facing camera and a rear-facing camera;
receive the second video stream from the second user device via a network connection;
in response to determining that the user-facing camera is the active camera, cause presentation of the second video stream in a primary display region and presentation of the first video stream in a secondary display region; and
in response to determining that the rear-facing camera is the active camera, cause presentation of the first video stream in the primary display region and presentation of the second video stream in the secondary display region.

2. The system of claim 1, further comprising a second application module that executes on the viewer device, wherein the second application module configures the viewer device to at least:
receive the video corresponding to the video call;
cause presentation of the video corresponding to the video call;
cause presentation of an annotation selection region;
receive annotation input corresponding to selection of an item in the annotation selection region; and
generate annotation data reflecting selection of the item in association with a portion of the video corresponding to the video call.

3. The system of claim 2, wherein the second application module further configures the viewer device to at least generate a cubing report based at least partly on the annotation data.

4. The system of claim 3, wherein the cubing report comprises volume information regarding an object displayed in the video corresponding to the video call, and wherein the annotation data relates to the object.

5. A computer-implemented method comprising:
under control of a first user computing device comprising one or more computer processors configured to execute specific instructions,
receiving, via a network connection, a first video stream generated by a second user computing device;
determining which camera, of a plurality of cameras of the first user computing device, is active;
in response to determining that a first camera of the plurality of cameras is active, causing presentation of the first video stream in a primary display region and presentation of a second video stream in a secondary display region, wherein the second video stream is generated by the first camera; and
in response to determining that a second camera of the plurality of cameras is active, causing presentation of the first video stream in the secondary display region and presentation of a third video stream in the primary display region, wherein the third video stream is generated by the second camera.

6. The computer-implemented method of claim 5, wherein the first camera comprises a user-facing camera, and wherein the second camera comprises a rear-facing camera.

7. The computer-implemented method of claim 5, wherein the primary display region is larger than the secondary display region.

8. The computer-implemented method of claim 5, wherein the second video stream, when presented, is mirrored across a vertical axis, and wherein the third video stream, when presented, is not mirrored across a vertical axis.

9. The computer-implemented method of claim 5, wherein the first video stream is received from the second user computing device.

10. The computer-implemented method of claim 5, wherein the first video stream is received from a server computing device acting as an intermediary between the first user computing device and the second user computing device.

11. The computer-implemented method of claim 5, further comprising transmitting, via the network connection, the second video stream and the third video stream to the second user computing device.

12. The computer-implemented method of claim 5, further comprising transmitting, via the network connection, the second video stream and the third video stream to a server computing device separate from the second user computing device.

13. Non-transitory computer storage having stored thereon an application module configured to execute on a first user computing device, wherein the application module causes the first user computing device to perform a process comprising:
receiving, via a network connection, a first video stream generated by a second user computing device;
determining which camera, of a plurality of cameras of the first user computing device, is active;
in response to determining that a first camera of the plurality of cameras is active, causing presentation of the first video stream in a primary display region and presentation of a second video stream in a secondary display region, wherein the second video stream is generated by the first camera; and
in response to determining that a second camera of the plurality of cameras is active, causing presentation of the first video stream in the secondary display region and presentation of a third video stream in the primary display region, wherein the third video stream is generated by the second camera.

14. The non-transitory computer storage of claim 13, wherein the first camera comprises a user-facing camera, and wherein the second camera comprises a rear-facing camera.

15. The non-transitory computer storage of claim 13, wherein the primary display region is larger than the secondary display region.

16. The non-transitory computer storage of claim 13, wherein the second video stream, when presented, is mirrored across a vertical axis, and wherein the third video stream, when presented, is not mirrored across a vertical axis.

17. The non-transitory computer storage of claim 13, wherein the first video stream is received from the second user computing device.

18. The non-transitory computer storage of claim 13, wherein the first video stream is received from a server computing device acting as an intermediary between the first user computing device and the second user computing device.

19. The non-transitory computer storage of claim 13, wherein the process further comprises transmitting, via the network connection, the second video stream and the third video stream to the second user computing device.

20. The non-transitory computer storage of claim 13, wherein the process further comprises transmitting, via the network connection, the second video stream and the third video stream to a server computing device separate from the second user computing device.

* * * * *